(12) United States Patent
Senjo

(10) Patent No.: US 7,008,311 B2
(45) Date of Patent: Mar. 7, 2006

(54) LAPPING TOOL

(75) Inventor: Motohiro Senjo, Shizuoka (JP)

(73) Assignee: Senjo Seiki Corporation, Shizuoka (JP)

( * ) Notice: Subject to any disclaimer, the term of this patent is extended or adjusted under 35 U.S.C. 154(b) by 0 days.

(21) Appl. No.: 10/470,053

(22) PCT Filed: Jan. 16, 2002

(86) PCT No.: PCT/JP02/00238

§ 371 (c)(1),
(2), (4) Date: Jul. 24, 2003

(87) PCT Pub. No.: WO02/058889

PCT Pub. Date: Aug. 1, 2002

(65) Prior Publication Data

US 2004/0152404 A1 Aug. 5, 2004

(30) Foreign Application Priority Data

| Jan. 25, 2001 | (JP) | ............................. 2001-017047 |
| Jul. 19, 2001 | (JP) | ............................. 2001-219299 |

(51) Int. Cl.
 *B24B 3/00* (2006.01)
(52) U.S. Cl. ...................... 451/484; 451/485; 451/486
(58) Field of Classification Search ............... 451/484, 451/485, 486, 504, 51
See application file for complete search history.

(56) References Cited

U.S. PATENT DOCUMENTS

| 111,057 | A | * | 1/1871 | Harding | ...................... 451/504 |
| 408,876 | A | * | 8/1889 | Distin | ......................... 451/504 |
| 1,437,548 | A | * | 12/1922 | Powell | ....................... 451/485 |
| 1,445,154 | A | * | 2/1923 | Miller | ......................... 451/485 |
| 1,575,267 | A | * | 3/1926 | Houldsworth | ............... 451/484 |
| 1,749,982 | A | * | 3/1930 | Nesbitt | ..................... 29/90.01 |
| 2,099,207 | A | * | 11/1937 | Hill et al. | ................... 451/485 |
| 2,149,330 | A | * | 3/1939 | Blount | ......................... 451/51 |
| 2,195,493 | A | * | 4/1940 | McGovern et al. | ........ 451/485 |
| 2,240,440 | A | * | 4/1941 | Hoern | ....................... 451/470 |
| 2,287,000 | A | * | 6/1942 | Lang | ............................ 451/51 |
| 2,298,367 | A | * | 10/1942 | Glaude | ....................... 451/504 |
| 2,340,767 | A | * | 2/1944 | Prange | ...................... 451/479 |
| 2,390,916 | A | * | 12/1945 | Bothner | ..................... 451/559 |
| 2,397,463 | A | * | 4/1946 | Boeck et al. | .............. 451/143 |
| 2,788,621 | A | * | 4/1957 | Doyle | ........................ 451/485 |
| 2,946,160 | A | * | 7/1960 | Hay | ............................. 451/52 |
| 3,462,887 | A | * | 8/1969 | Hackman, Jr. | ............. 451/541 |
| 4,099,350 | A |  | 7/1978 | Hasty |  |
| 6,739,949 | B1 | * | 5/2004 | Becksvoort et al. | .......... 451/28 |

FOREIGN PATENT DOCUMENTS

| JP | 50-110897 | 9/1975 |
| JP | 62-81559 | 5/1987 |
| JP | 63-7265 | 1/1988 |
| JP | 63-60561 | 4/1988 |
| JP | 3005414 | 10/1994 |
| JP | 3016312 | 7/1995 |
| JP | 11-58246 | 3/1999 |
| JP | 2000-343327 | 12/2000 |

* cited by examiner

*Primary Examiner*—M. Rachuba
(74) *Attorney, Agent, or Firm*—McGinn IP Law Group, PLLC

(57) ABSTRACT

A lapping tool capable of increasing the accuracy of a lapping operation, extending the life of lapping tool itself, adjusting a lapping diameter, and coping with the lapping operation of various diameters, comprising a lapping tool body having a lapping part on the outer peripheral surface thereof and slits provided in the lapping tool body axially between the tip part and the base part thereof.

21 Claims, 8 Drawing Sheets

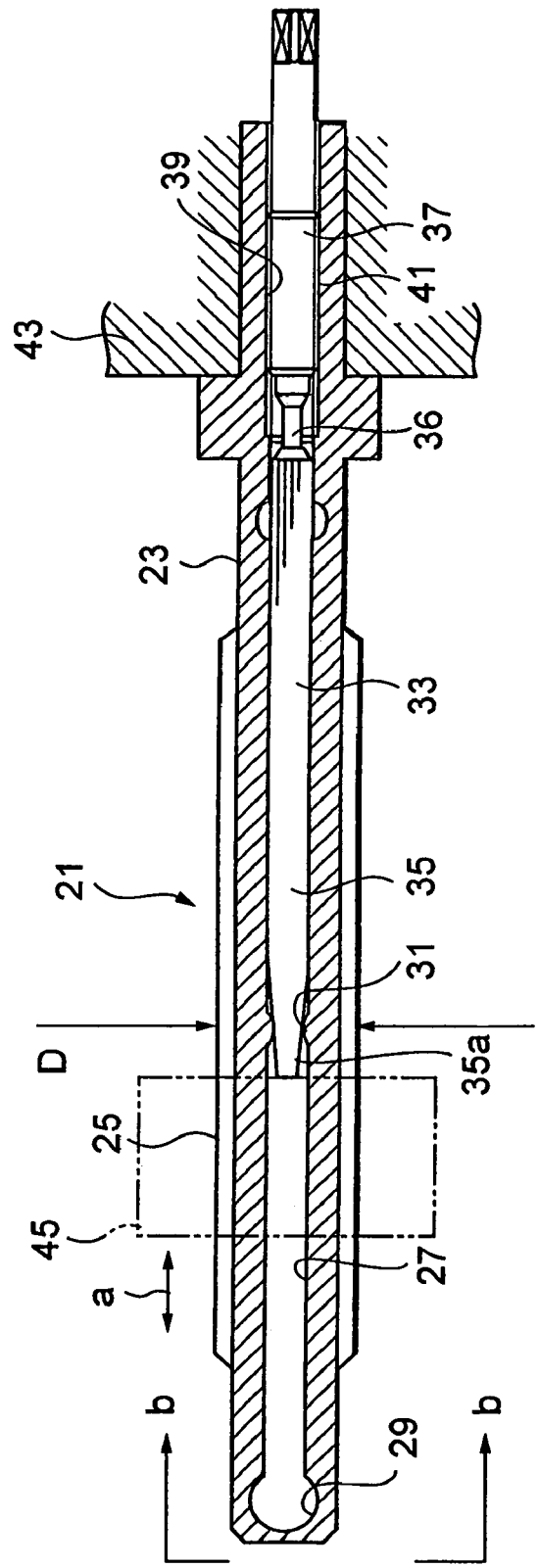
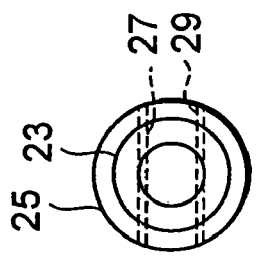
FIG.2

FIG. 4
(a) 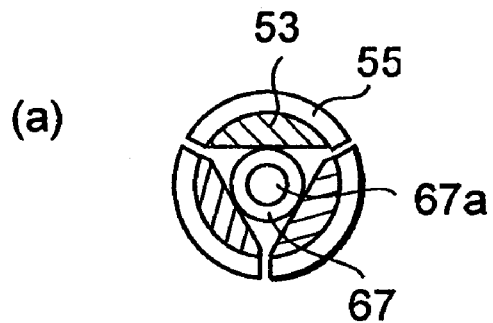
(b) 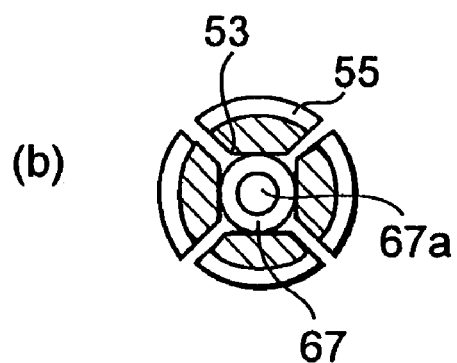
(c) 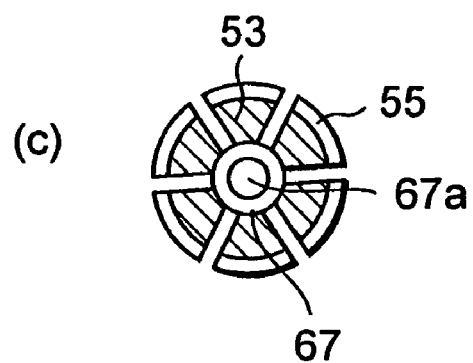

LAPPING TOOL

TECHNICAL FIELD

The present invention relates to a lapping tool used for a lapping operation. More particularly, the present invention relates to the lapping tool which prevents warping of the tool during lapping operation, in order to improve the quality of products, and being capable of adjustment of lapping diameter.

BACKGROUND ART

There are several driving mechanisms of an actuator, such as a ball screw/ball nut mechanism. The ball screw/ball nut mechanism comprises a ball screw, and a ball nut being engaged with the ball screw. The rotative movement of the ball nut has been prohibited, and when the ball screw is rotated by a servo motor, the ball nut will move axially in the forward and the rearward directions. Accordingly, the ball nut will accept various devices to be attached thereto.

The ball screws and the ball nuts used for the above mechanism were firstly manufactured by respective special machining apparatus, and then, the finishing of the thread surfaces, etc. were done by a lapping operation. For example, when the lapping is applied to the inner thread surface of a ball nut, a lapping tool, which is generally called as "lapping bar", is used. The lapping bar has a thread part formed on the outer surface of an axial member, and also has slits which have been formed in the axial direction.

When the lapping operation is done, first, the lapping tool is rotated. Then the ball nut, i.e. the object to be lapped, becomes engaged with the lapping tool, whereby the lapping is applied to the inner thread part of the ball nut. At that time, the lapping tool is elastically displaced according to the elastic displacement range of the slits, and the lapping operation is done by means of the elastic force of the lapping tool, which has been accumulated by such a displacement of the slits.

However, the conventional lapping tools discussed as above have the following problems.

First, as discussed above, the lapping tool has the elongating slits formed in the axial direction, and the slits serve the substantial role for the lapping operation. However, because the tip part of the slits is formed to be open, this will cause the warping of the lapping tool, whereby the lapping accuracy will be deteriorated, and consequently the life of the lapping tool will be shortened.

Second, because the lapping diameter of the conventional lapping tool has been fixed, when the lapping is applied to ball nuts having various diameters, the lapping must be applied by various lapping tools having the corresponding various diameters, thus it is necessary to prepare and change various diameters of lapping tools in advance.

In the light of technical backgrounds and problems according to the conventional lapping tools discussed as above, it is an object of the present invention to provide a lapping tool, having the improved lapping accuracy and the long tool life. Further, it is another object of the present invention to provide a lapping tool of which lapping diameter is adjustable, corresponding to various lapping diameters.

The present invention is relevant to several prior inventions, such as Japanese Unexamined Patent Publication No. 2000-343327. This prior invention relates to a reamer, wherein the adjustment and setting of the finish diameter by reamer can be done mechanically.

DISCLOSURE OF INVENTION

A first exemplary embodiment of the present invention provides a lapping tool with a lapping tool body having a lapping part on the outer peripheral surface thereof; and with slits formed in the lapping tool body axially between the tip part and the base part thereof. In this manner, the warping on account of slits may be prevented.

A second exemplary embodiment of the present invention provides a lapping tool with a lapping tool body having a lapping part on the outer peripheral surface thereof; with slits formed in the lapping tool body axially between a tip part and a base part thereof with having a lapping diameter adjustment section; and with a lapping diameter adjustment member, capable of being axially inserted into the lapping diameter adjustment section, and also capable of being drawn out of the lapping diameter adjustment section, and which adjusts the diameter of the lapping tool body via the lapping diameter adjustment section. In this manner, the lapping diameter may de adjusted arbitrarily.

A third exemplary embodiment of the present invention provides a lapping tool with lapping tool body having a lapping part on the outer peripheral surface thereof; with slits formed in the lapping tool body axially between a tip part and a base part thereof with having a lapping diameter adjustment section; with a lapping diameter adjustment member, capable of being axially inserted from one end into the lapping diameter adjustment section, and also capable of being drawn out of the lapping diameter adjustment section, and which adjusts the diameter of the lapping tool body via the lapping diameter adjustment section; with a drive means which applies force to the lapping diameter adjustment member in the direction of increasing the lapping diameter; and with a lapping diameter regulation means, capable of being axially inserted from the other end into the lapping diameter adjustment section, and also capable of being drawn out of the lapping diameter adjustment section, and which regulates the lapping diameter at a predetermined amount by prohibiting the movement of the lapping diameter adjustment member in the direction of increasing the lapping diameter. In this manner, the lapping diameter may be regulated surely at a predetermined amount.

It is also possible to apply various structures to the drive means. A fourth exemplary embodiment of the present invention provides a lapping tool with a lapping tool body having a lapping part on the outer peripheral surface thereof; with slits formed in the lapping tool body axially between a tip part and a base part thereof; and with an arbitrary number of lapping diameter adjustment members, being screwed in the radial direction, from a side part of the lapping tool body, into the slits thereof, and which adjust the diameter of the lapping tool body. In this manner, the structure for lapping diameter adjustment may be simplified.

It is also possible to apply various structures to the lapping diameter adjustment members.

A fifth exemplary embodiment of the present invention provides a lapping tool with a lapping tool body, having a hollow part, and a lapping part on the outer peripheral surface thereof, and also having a lapping diameter adjustment section inside the hollow part; and with a lapping diameter adjustment member, capable of being axially inserted from one end into the hollow part of the lapping tool body, and also capable of being drawn out of the hollow part, and which adjusts the diameter of the lapping tool body via the lapping diameter adjustment section. In this manner, the structure thereof may be simplified remarkably.

A sixth exemplary embodiment of the present invention includes flat parts for collecting cut waste. In this manner, it is possible to provide spaces for the cut waste during the lapping operation.

For reference, in the case of the prior art disclosed in Japanese examined Patent Publication No. 2000-343327, there is no consideration given to the warping on account of the slits, and although the finish diameter during reamer working may be adjusted and set mechanically, the diameter is still fixed, and the finishing operation is not done gradually in order to obtain a predetermined diameter by using elastic force.

On the other hand, according to an exemplary embodiment of the present invention, the slits have been formed in the lapping tool body between the tip part and the base part thereof. In this manner, the warping on account of slits may be prevented. Therefore, it is possible to prevent the deterioration of preciseness of lapping due to warping, or the short life of lapping tool.

In another exemplary embodiment of the present invention, the lapping diameter adjustment member is inserted into the lapping diameter adjustment section of the lapping tool body at an appropriate amount, so that the outer diameter of the lapping tool body, that is the lapping diameter, may be adjusted via the lapping diameter adjustment section inside the hollow part. Therefore, it is possible to cope with various lapping operations of which lapping diameters are not the same, by using a single lapping tool.

In yet another exemplary embodiment of the present invention, the force is applied to the lapping diameter adjustment member in the direction of increasing the lapping diameter by the driving means, and at the same time, the lapping diameter regulation means has been inserted until reaching an appropriate position, so that the lapping diameter may be regulated at a predetermined amount. Therefore, it is possible to facilitate the lapping operation.

In a further exemplary embodiment of the present invention, the slits are not formed in the lapping tool body itself. Instead, the diameter of the lapping tool body may be adjusted, via the lapping diameter adjustment section, by appropriately inserting the lapping diameter adjustment member into such a lapping tool body. Therefore, the structure thereof may be simplified remarkably.

Preferably, when the grinding particles are fixed, it is possible to improve the lapping workability.

Preferably, when the outer diameter of the lapping tool body is in the taper shape, it is also possible to accomplish the smooth movement of lapping operation.

BRIEF DESCRIPTION OF DRAWINGS

FIG. 1 illustrates a first embodiment of the present invention, wherein FIG. 1(a) is a front view of a lapping tool, and FIG. 1(b) is a view as viewed from an arrow b—b of FIG. 1(a);

FIG. 2 illustrates a second embodiment of the present invention, wherein FIG. 2(a) is a front view of a lapping tool, and FIG. 2(b) is a view as viewed from an arrow b—b of FIG. 2(a);

FIG. 3 illustrates a third embodiment of the present invention, wherein FIG. 3(a) is a front view of a lapping tool, and FIG. 3(b) is a view as viewed from an arrow b—b of FIG. 3(a);

FIG. 4 illustrates modifications of the third embodiment of the present invention, wherein FIG. 4(a), FIG. 4(b) and FIG. 4(c) are side views of lapping tools respectively;

FIG. 5 illustrates a fourth embodiment of the present invention, wherein FIG. 5(a) is a front view of a lapping tool, and FIG. 5(b) is a view as viewed from an arrow b—b of FIG. 5(a);

FIG. 6 illustrates a fifth embodiment of the present invention, wherein FIG. 6(a) is a front view of a lapping tool, and FIG. 6(b) is a view as viewed from an arrow b—b of FIG. 6(a);

BEST MODE FOR CARRYING OUT THE INVENTION

Figure 1:
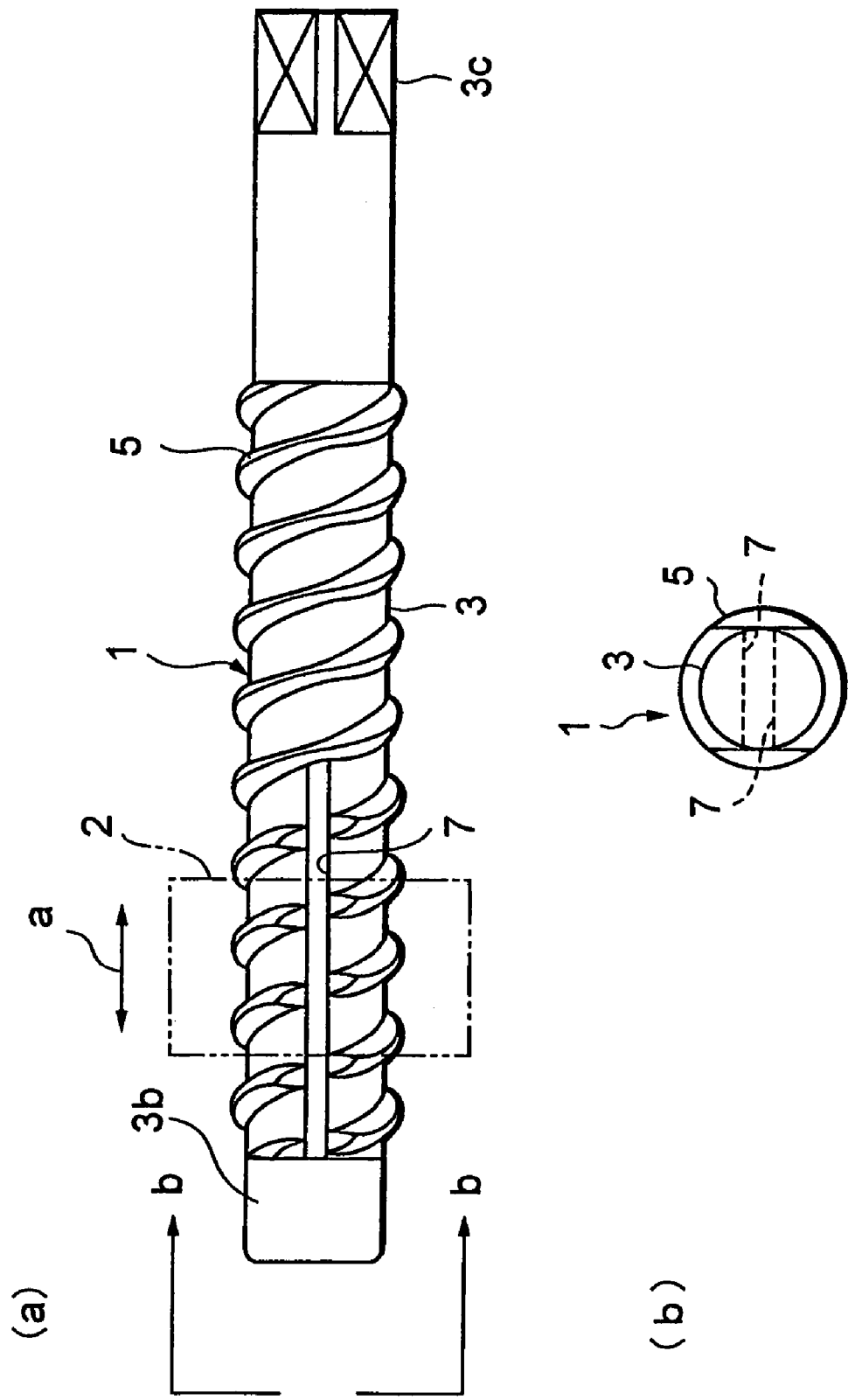

A first embodiment of the present invention will be explained with reference to FIG. 1. FIG. 1(a) is a front view of a lapping tool 1, and FIG. 1(b) is a view as viewed from an arrow b—b of FIG. 1(a).

There is a lapping tool body 3, having a thread part 5 serving for lapping operation on the outer peripheral surface of the lapping tool body 3. The lapping tool body 3 has the solid-core structure, as illustrated in FIG. 1(b).

The lapping tool body 3 also has a slit 7 axially elongating for a predetermined length, provided between a tip part 3b and a base part 3c. The slit 7 is formed, as shown in FIG. 1(a), so that the front side and the rear side are penetrating through each other (i.e. penetrating in the horizontal direction of FIG. 1(b)).

The lapping tool 1 discussed as above is attached to a spindle of a lapping machine (not shown) via the base part 3c. Then, a ball nut 2 (shown by imaginary lines in FIG. 1(a)), i.e. the object to be lapped, becomes engaged with the thread part 5 via the tip part 3b, whereby a predetermined lapping is applied to a thread part (not shown) of the above ball nut 2, by axially moving the ball nut 2 in the forward and rearward directions, as illustrated by an arrow "a" of FIG. 1(a).

The outer surface of the lapping tool 1 has grinding particles (e.g. diamond particles) accreting thereto. The accretion of grinding particles may be done by "fixing method" or "isolation method". For example, electrodeposition or adhesive may be used for the fixing method, whereby the grinding particles have been accreted and fixed in advance, on the outer surface of the lapping tool 1. On the other hand, with reference to the isolation method, the grinding particles are accreted to be movable on the outer surface of the lapping tool 1, during the lapping operation.

The present embodiment as discussed above has the following merit.

According to the present embodiment, the slit 7 is formed between the tip part 3b and the base part 3c of the lap tool body 3, and the tip part of the slit 7 is not open (i.e. is not separately provided), it is possible to prevent the warping on account of the slit 7.

Consequently, it is possible to improve the accuracy of lapping, and it is also possible to extend the life of the lapping tool 1.

Now a second embodiment of the present invention will be explained with reference to FIG. 2. FIG. 2(a) is a front sectional view of a lapping tool 21, and FIG. 2(b) is a view as viewed from an arrow b—b of FIG. 2(a).

There is a lapping tool body 23 having the solid-core structure. The lapping tool body 23 has a thread part 25 serving for lapping operation on the outer peripheral surface thereof. The lapping tool body 23 also has an axially elongating slit 27, being formed, as shown in FIG. 2(a), in the state that the front side and the rear side are penetrating through each other (i.e. penetrating in the horizontal direction of FIG. 2(b)). There is a penetrating hole 29 having a larger diameter, provided at the tip part (on the left side of FIG. 2(a)) of the slit 27.

There is a narrow part 31 serving as a lapping diameter adjustment section, substantially at the center of the slit 27 in the elongating direction. Further, a lapping diameter adjustment member 33 is inserted into the slit 27, from one end of the axis (from the right side of FIG. 2(a)). The lapping diameter adjustment member 33 may be drawn out of the slit 27. The lapping diameter adjustment member 33 has a tip shaft part 35 and a base shaft part 37. The tip shaft part 35 has a taper part 35a in a taper shape, and the tip shaft part 35 and the base shaft part 37 are integrally provided via a thin part 36. Further, a female thread part 39 formed on the lapping tool body 23 is engaged with a male thread part 41 formed on the base shaft part 37.

Accordingly, by appropriately adjusting the screw driving amount of the lapping diameter adjustment member 33 against the lapping tool body 23, it is possible to adjust the lapping diameter.

For example, when the screw driving amount of the lapping diameter adjustment member 33 against the lapping tool body 23 is increased, the tip shaft part 35 will be inserted into the lapping tool body 23 deeply, thus the outer diameter of the lapping tool body 23 will become wider, by means of the taper part 35a and the lapping diameter adjustment section 31. Consequently, the lapping diameter (D) becomes larger. On the other hand, when the screw driving amount of the lapping diameter adjustment member 33 against the lapping tool body 23 is decreased, the insertion amount of the tip shaft part 35 into the lapping tool body 23 will become smaller, thus the expansion of the outer diameter of the lapping tool body 23, by means of the taper part 35a and the lapping diameter adjustment section 31, will become lessened. Consequently, the lapping diameter (D) becomes smaller, due to the self resilience.

The screw driving amount of the lapping diameter adjustment member 33 may be adjusted, by manual operation of an operator, or by using a driving motor.

The lapping tool 21 discussed as above is attached to a spindle 43 of a lapping machine via a base part of the lapping tool body 23. Then, a ball nut 45 (shown by imaginary lines in FIG. 2(a)), i.e. the object to be lapped, becomes engaged with the thread part 25 via a tip part of the lapping tool body 23, whereby a predetermined lapping is applied to a thread part (not shown) of the above ball nut 45, by axially moving the ball nut 45 in the forward and rearward directions, as illustrated by an arrow "a" of FIG. 2(a).

The second embodiment as discussed above has the following merits.

According to the second embodiment, the lapping diameter (D) can be adjusted, by appropriately adjusting the screw driving amount of the lapping diameter adjustment member 33 against the lapping tool body 23. Thus, it is possible to cope with various lapping operations of which lapping diameters (D) are not the same, by using a single lapping tool 21.

Further, according to the second embodiment, the lapping tool body 23 has the solid-core structure, and the tip part is not provided separately. Thus, it is also possible to prevent the warping of the lapping tool body 23.

Figure 3:
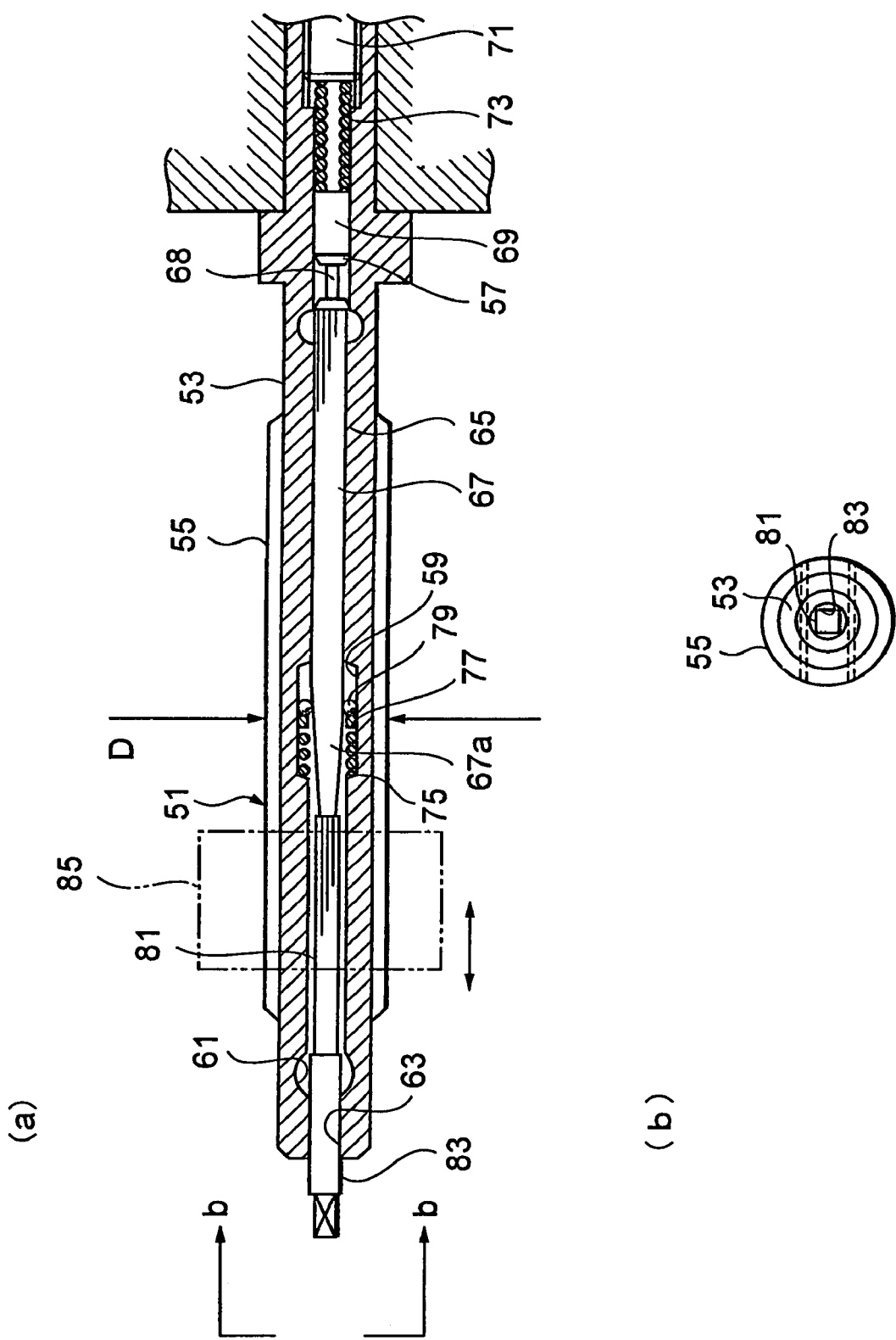

Now a third embodiment of the present invention will be explained with reference to FIG. 3. FIG. 3(a) is a front sectional view of a lapping tool 51, and FIG. 3(b) is a view as viewed from an arrow b—b of FIG. 3(a).

There is a lapping tool body 53, having a thread part 55 serving for lapping operation on the outer peripheral surface thereof. The lapping tool body 53 also has an axially elongating slit 57, being formed, as shown in FIG. 3(a), in the state that the front side and the rear side are penetrating through each other (i.e. penetrating in the horizontal direction of FIG. 3(b)). The slit 57 has a wide part 59, positioned substantially at the center of the slit 57 in the axial direction, but to some extent closer to the tip part of the slit 57. The wide part 59 serves as the lapping diameter adjustment section. Further, there is a penetrating hole 59 having somewhat a larger diameter, at the tip part (on the left side of FIG. 1(a)) of the slit 57. The penetrating hole 61 also has another hole on the side of the tip, penetrating in the axial direction, in which a female thread part 63 is provided.

There is a lapping diameter adjustment member 65, inserted into the slit 57, from one end of the axis (from the right side of FIG. 3(a)). The lapping diameter adjustment member 65 may be drawn out of the slit 57. The lapping diameter adjustment member 65 comprises a tip shaft part 67 and a base shaft part 69. The tip shaft part 67 has a taper part 67a in a taper shape, and the tip shaft part 67 and the base shaft part 69 are integrally provided via a thin part 68. There is a shaft member 71 screwed into the bottom lapping tool body 53, in the rear of the base shaft part 69. There is also a first coil spring 73 serving as a drive means, connecting the base shaft part 69 with the shaft member 71 by applying the tension. Accordingly, the force toward the left of FIG. 3(a) (in the expanding direction of the lapping diameter (D)) is always applied to the lapping diameter adjustment member 65, by means of the first coil spring 73.

There is a second coil spring 75, a ring member 77 and a plurality of steel balls 79, on the outer periphery of the tip shaft part 67 of the lapping diameter adjustment member 65, inside the wide part 59 of the slit 57. These steel balls 79 are always pressed against the surface of the taper part 67a, by elastic force of the second coil spring 75.

There is another shaft member 81 serving as a lapping diameter regulation means, axially inserted into the slit 57, from the other end (from the left side of FIG. 3(a)). The shaft member 81 may be drawn out of the slit 57. There is a male thread part 83 formed on the shaft member 81, and the male thread part 83 is engaged with a female thread part 63 of the slit 57. When the shaft member 81 is screwed into the slit 57 to a predetermined amount, the tip of the shaft member 81 is positioned at a predetermined position, whereby the lapping diameter may be regulated at a predetermined amount. This is because, the tip of the lapping diameter adjustment member 65 will collide with the tip of the shaft member 81, and no further movement is permitted.

According to the structure as discussed above, the tip of the shaft member 81 is positioned at a predetermined position, that is, a predetermined position in order to obtain a predetermined lapping diameter. In this initial phase, as illustrated in FIG. 3(a), the tip of the lapping diameter adjustment member 65 is in contact with the tip of the shaft member 81. Then, the lapping tool 51 is rotated in that state, and a ball nut 85 (shown by imaginary lines in FIG. 3(a)), i.e. the object to be lapped, becomes engaged with the lapping tool 51, whereby a predetermined lapping is applied to a thread part (not shown) of the above ball nut 85, by axially moving the ball nut 85 in the forward and rearward directions, as illustrated by an arrow "a" of FIG. 3(a). When the inner diameter of the ball nut 85 is smaller and the resistance to the lapping is larger, the lapping diameter (D) will be reduced, whereby the lapping diameter adjustment member 65 will be pressed rearwardly, to the right of FIG. 3(*a*). Thereafter, as the inner diameter of the ball nut 85 becomes gradually larger in order to the desired value, the lapping diameter adjustment member 65 will move toward the left of FIG. 3(*a*). Thus the lapping operation is carried out gradually. In the final phase, the tip of the lapping diameter adjustment member 65 collides with the tip of the shaft member 81, and the lapping diameter adjustment member 65 returns to the initial state, whereby the further movement is prohibited. This very state is illustrated in FIG. 3(*a*), and the lapping operation is completed in this phase.

According to the present embodiment, it is possible to regulate the lapping diameter (D) at a predetermined value by the shaft member 81, and thereafter, it is sufficient to simply carry out the lapping operation until the tip of the lapping diameter adjustment member 65 collides with the tip of the shaft member 81. Therefore, the lapping operation may be facilitated, and it is possible to surely obtain the desired lapping diameter (D) during the lapping operation.

According to this third embodiment, the lapping tool body 53 has the two-section structure, divided into two parts in the axial direction by the slit 57. However, it is also possible to provide a three-section structure as illustrated in FIG. 4(*a*). Similarly, it is also possible to provide a four-section structure as illustrated in FIG. 4(*b*), or a six-section structure as illustrated in FIG. 4(*c*). Each of FIGS. 4(*a*) (*b*) and (*c*) illustrates the sectional view of the lapping tool, which has been cut at the tip of the top end of the tip shaft part 67 of the lapping diameter adjustment member 65.

The above structures can be also applied to the first and second embodiments. Although the first and second embodiments illustrate the two-section structure, it is also possible to provide the three-section, four-section or six-section structure.

Figure 5:
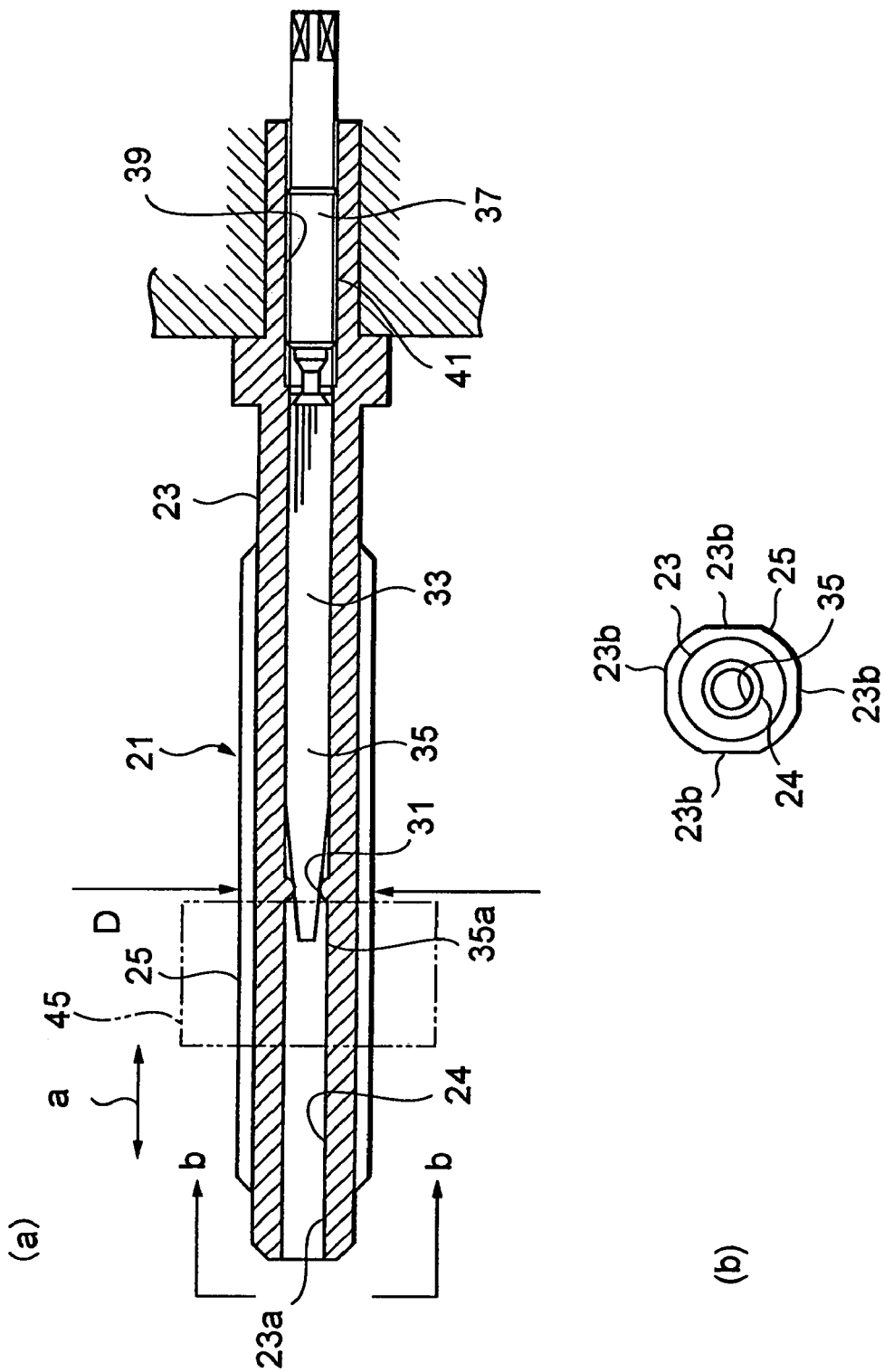

Now a fourth embodiment of the present invention will be discussed with reference to FIG. 5. According to the fourth embodiment, the lapping tool body 23 of the second embodiment comprises a hollow cylindrical shape, without having any slit. The top of the lapping tool body 23 is open, serving as an opening 23*a*. As illustrated in FIG. 5(*b*), there are four flat parts 23*b* provided on the lapping tool body 23, being perpendicular to each other. These flat parts 23*b* collects cut waste during the lapping operation.

The other structure is substantially the same as that of the second embodiment as discussed above, thus the detailed explain thereof will be omitted, by simply giving the same reference numerals to the same structural parts.

It is noted that reference numeral 24 illustrates a hollow part.

According to this structure, it is not necessary to provide any slit in the lapping tool body 23, whereby the simple structure and the lower cost may be accomplished. Further, since there is no slit, the warping will not occur even when a large amount of load is given to the lapping tool, whereby more accurate lapping operation may be effectively carried out.

Figure 6:
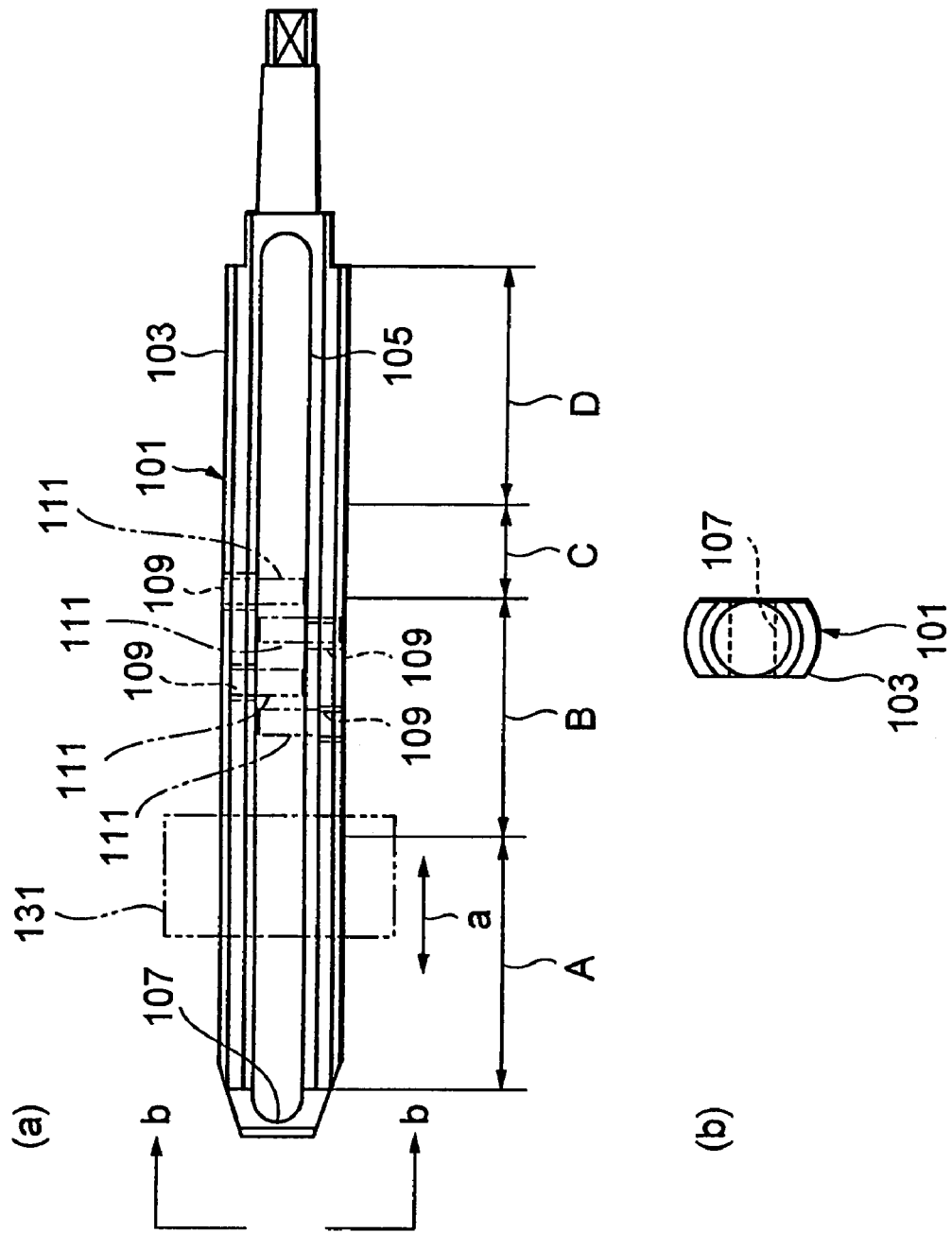

Now a fifth embodiment of the present invention will be discussed with reference to FIGS. 6 through 8. As illustrated in FIG. 6, there is a lapping tool body 101 having the solid-core structure. The lapping tool body 101 has a thread part 103 serving for lapping operation on the outer peripheral surface thereof. The lapping tool body 101 also has an axially elongating slit 105, being formed, as shown in FIG. 6(*a*), in the state that the front side and the rear side are penetrating through each other. There is a penetrating hole 107 provided at the tip part (on the left side of FIG. 6(*a*)) of the slit 105.

There are four lapping diameter adjustment sections, at the center in the axial direction of the lapping tool body 101. Each of the lapping diameter adjustment sections is provided with a female thread part 109, elongating toward the axial center of the lapping tool body 101. The female thread parts 109 are respectively engaged with lapping diameter adjustment members 111, as illustrated in FIG. 7.

For reference, FIG. 6(*a*) illustrates the lapping diameter adjustment members 111 by imaginary lines, in the state that the lapping diameter adjustment members 111 are provided by being engaged with the female thread parts 109.

Figure 7:
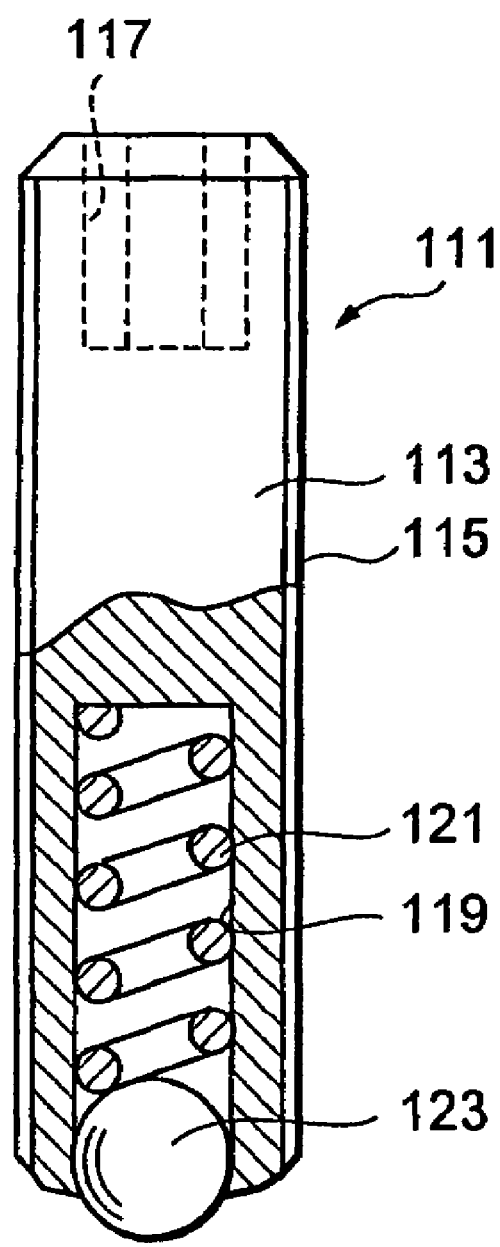
FIG. 7 is a sectional view of a lapping diameter adjustment member according to the fifth embodiment of the present invention.

As illustrated in FIG. 7, the lapping diameter adjustment member 111 comprises an adjustment member body 113, and there is a male thread part 115 provided on the outer peripheral surface of the adjustment member body 113, so that the male thread part 115 may be engaged with the female thread part 109 respectively. Further, there is a hexagonal hole 117 provided at the head of the adjustment member body 113, accepting a hexagonal-shape wrench (not shown). There is a recessed part 119 formed at the end of the adjustment member body 113, incorporating a ball 123 together with a coil spring 121. The coils spring 121 applies the elastic force to the ball 123, in the outward direction from the recessed part 119. However, since the rim of the recessed part 119 has been clinched, the ball 123 will not pop out of the recessed part 119.

The lapping diameter adjustment members 111, respectively having the structure as discussed structure, become engaged with corresponding four female thread parts 109, via the male thread parts 115 thereof. The respective lapping diameter adjustment members 111 are screwed, until being positioned where the ball 123 at the end thereof becomes in contact with the inner peripheral surface of the lapping tool body 101 on the other side, so that the said inner peripheral surface may be pressed outwardly and may increase the inner diameter, in order to increase the lapping diameter by a predetermined amount. Consequently, it is possible to adjust the lapping diameter.

When the outer diameter of the lapping tool body 101 is seen along the axial direction, as illustrated in FIG. 6(*a*), there are four sections A, B, C and D. The section A is in a taper shape, of which outer diameter becomes gradually larger from the left to the right of FIG. 6(*a*). The section B is also in a taper shape, of which outer diameter becomes gradually larger from the left to the right, but the degree of taper shape is smaller (i.e. the taper angle is gentler) than that of the section A. The section C is in a flat shape. The section D is also a taper shape, of which outer diameter becomes gradually smaller from the left to the right of FIG. 6(*a*), and the taper angle is the same as that of the section A. This structure will serve for much facilitated lapping operation.

According to the structure as discussed above, first, the lapping diameter adjustment members 111 are respectively screwed into four accepting positions of the lapping tool body 101, so that the outer periphery of the lapping tool body becomes a predetermined diameter. Then, a ball nut 131 (shown by imaginary lines in FIG. 6(*a*)) becomes engaged with the lapping tool body 101, whereby the lapping is applied to the ball nut 131, by axially moving the ball nut 131 in the forward and rearward directions, as illustrated by an arrow "a" of FIG. 6(*a*). In the initial phase when the lapping has just started, since the inner diameter of the ball nut 131 is still small, the outer diameter of the lapping tool body 101 is reduced. In other words, the ball 123 of each lapping diameter adjustment member 111 is pressed inwardly, against the elastic force of the coil spring 121.

As the lapping operation develops, the inner diameter of the ball nut 131 becomes gradually larger, whereby the ball 123 of each lapping diameter adjustment member 111 is pressed outwardly. Eventually, in the final phase, the lapping is completed at a predetermined lapping diameter, that is the initially set diameter. Therefore, it is possible to carry out the lapping operation gradually in order to obtain a predetermined lapping diameter, without applying any excessive force.

Accordingly, the present embodiment may serve the same effect as those discussed in the first through fourth embodiments. Further, the present embodiment also has a merit that the lapping diameter adjustment structure may be simplified. In addition, the improved taper parts may present much facilitated action during the lapping operation. In particular, the two-stage taper parts at the end thereof will reduce the resistance to the lapping operation, which would occur in the initial phase of lapping.

Figure 8:
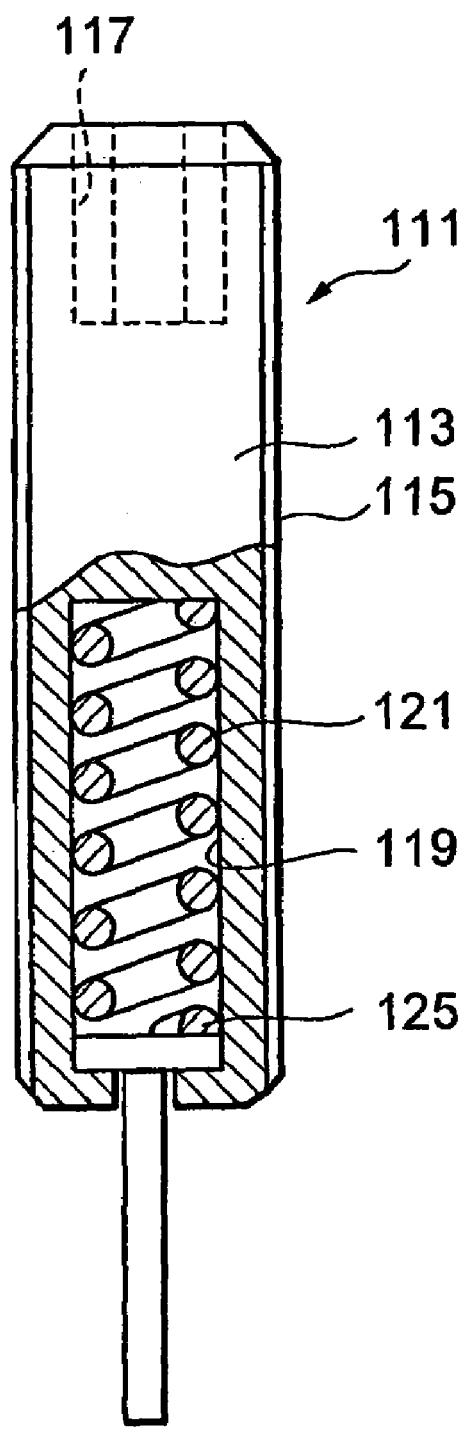
FIG. 8 is a sectional view of a lapping diameter adjustment member according to the fifth embodiment of the present invention.

With reference to this fifth embodiment, it is possible to provide another structure of the lapping diameter adjustment member, as illustrated in FIG. 8. According to FIG. 8, in stead of the ball 123 used for the lapping diameter adjustment member 111 of FIG. 7, a flanged pin 125 is used. The flanged pin 125 has a merit that a larger stroke amount than that of the ball 123 may be obtained.

Further, in stead of the lapping diameter adjustment members 111 as illustrated in FIGS. 7 and 8, it is also possible to use ordinary screw members for the lapping diameter adjustment members.

The present invention is of course not limited to the first through fifth embodiments as discussed above.

For example, the number of slits, in the case of providing slits, may be determined arbitrarily.

It is also possible to provide the drive means for driving the lapping diameter adjustment member, other than the coil spring, such as a screw, pneumatic cylinder, oil cylinder, etc.

According to the embodiments as discussed above, the lapping operation has been explained, by using an example in which the lapping is applied to the thread part of ball nut, by forming the thread part on the lapping part. However, the present invention is not limited to such a lapping operation, and it is also possible, for example, to be used for finishing the simple inner peripheral surface of a hollow cylindrical object.

INDUSTRIAL APPLICABILITY

As above discussed, the present invention is useful as a lapping tool used for lapping operation. In particular, the present invention may improve the quality of lapped products, by preventing the warping, and the present invention also has a merit to facilitate the adjustment of the lapping diameter.

What is claimed is:

1. A lapping tool, comprising:
  a lapping tool body having a lapping thread part for lapping of a thread part by engaging with a thread part of an inner diameter part of a nut, and also having a tapered portion of which a diameter is gradually increasing from a tip side to a base side on the outer peripheral surface of said lapping tool body, wherein said tapered portion comprises a first tapered portion and a second tapered portion, and wherein the second tapered portion has an angle that is smaller than that of the first tapered portion;
  slits provided in said lapping tool body axially between a tip part and a base part of said lapping tool body; and
  an arbitrary number of lapping diameter adjustment members, being screwed inwardly in the radial direction, from an outer part of said lapping tool body, into said slits of said lapping tool body, and which adjust the diameter of said lapping tool body by pressing an end of said lapping diameter adjustment member against an inner surface of said lapping tool body.

2. The lapping tool as claimed in claim 1, wherein at least one of said lapping diameter adjustment members comprises:
  an adjustment member body screwed into said lapping tool body, and
  a working body incorporated via an elastic member in a recessed part which has been provided at an end of said adjustment member body.

3. The lapping tool as claimed in claim 1, wherein at least one of said lapping diameter adjustment members comprises a screw.

4. A lapping tool, comprising:
  a tool body having a tapped thread part for lapping of a thread part by engaging with a thread part of an inner diameter part of a nut, and also having a tapered portion of which a diameter is gradually increasing from a tip side to a base side on an outer peripheral surface, wherein said tapered portion comprises a first tapered portion and a second tapered portion, and wherein said second tapered portion has an angle that is smaller than the first tapered portion;
  a slit axially extending from a tip to a base of said tool body; and
  a diameter adjuster extending radially through said slit.

5. The lapping tool of claim 4, wherein said tool body comprises a hole radially extending through said tip of said tool body.

6. The lapping tool of claim 4, further comprising at least one flat surface on said outer peripheral surface of said tool body.

7. The lapping tool of claim 4, wherein said diameter adjuster comprises an elongate body comprising a male thread on an outer peripheral surface, wherein said male thread engages a female thread extending radially from said outer peripheral surface of said tool body into said slit.

8. The lapping tool of claim 7, wherein said elongate body further comprises a hexagonal hole at a first end.

9. The lapping tool of claim 8, wherein said elongate body further comprises a recess extending axially from a second end toward said first end.

10. The lapping tool of claim 9, wherein said diameter adjuster further comprises a ball and a biasing member within said recess.

11. The lapping tool of claim 10, wherein said biasing member biases said ball toward said second end.

12. The lapping tool of claim 11, wherein said biasing member comprises at least one of a coil spring, a pneumatic cylinder and an oil cylinder.

13. The lapping tool of claim 11, wherein said elongate body is clinched inwardly to trap said ball in said recess.

14. The lapping tool of claim 9, wherein said diameter adjuster further comprises a flanged pin and a biasing member within said recess.

15. The lapping tool of claim 14, wherein said biasing member biases said flanged pin toward said second end.

16. The lapping tool of claim 15, wherein said biasing member comprises at least one of a coil spring, a pneumatic cylinder and an oil cylinder.

17. The lapping tool of claim 15, wherein said elongate body includes a flange at said second end that traps a flange of said flanged pin within said recess.

18. The lapping tool of claim 4, wherein said tool body further comprises a flat surface on said outer peripheral surface.

19. The lapping tool of claim 18, wherein said tool body further comprises a third tapered portion on said outer peripheral surface.

20. The lapping tool of claim 19, wherein said third tapered portion gradually decreases in diameter from a tip end of said tool body toward a base end of said tool body.

21. The lapping tool of claim 20, wherein first tapered surface is positioned toward said tip end, said second tapered portion is adjacent to said first tapered portion in a direction toward said base end, said flat surface is adjacent to said second tapered portion in a direction toward said base end and said third tapered portion is adjacent to said flat surface in a direction toward said base end.

* * * * *